US008721949B2

(12) United States Patent
Wesson et al.

(10) Patent No.: US 8,721,949 B2
(45) Date of Patent: May 13, 2014

(54) MODULAR HANDRAIL CONSTRUCTION FOR A PASSENGER CONVEYOR HANDRAIL

(75) Inventors: John P. Wesson, Vernon, CT (US); John M. Milton-Benoit, West Suffield, CT (US); Changsheng Guo, South Windsor, CT (US); James R. Irish, Vernon, CT (US); Gopalakrishna Rajagopalan, Wethersfield, CT (US); Xiaomei Yu, Glastonbury, CT (US); Jun Ma, Hamden, CT (US); Foster P. Lamm, South Windsor, CT (US); Justin R. Hawkes, Marlborough, CT (US)

(73) Assignee: Otis Elevator Company, Farmington, CT (US)

( * ) Notice: Subject to any disclaimer, the term of this patent is extended or adjusted under 35 U.S.C. 154(b) by 602 days.

(21) Appl. No.: 12/598,244

(22) PCT Filed: May 9, 2007

(86) PCT No.: PCT/US2007/068516

§ 371 (c)(1), (2), (4) Date: Oct. 30, 2009

(87) PCT Pub. No.: WO2008/140515

PCT Pub. Date: Nov. 20, 2008

(65) Prior Publication Data

US 2010/0117263 A1 May 13, 2010

(51) Int. Cl.
*B29C 47/02* (2006.01)
*B66B 23/24* (2006.01)

(52) U.S. Cl.
USPC ..................... 264/279; 264/177.1; 264/177.2; 264/259; 264/263; 264/271.1; 264/279.1; 198/335; 198/336; 198/337

(58) Field of Classification Search
USPC .............. 264/259, 266, 267, 271.1, 274, 275, 264/279, 279.1, 177.1, 177.2, 263; 198/335, 336, 337
See application file for complete search history.

(56) References Cited

U.S. PATENT DOCUMENTS 3,633,725 A 1/1972 Smith
3,865,225 A * 2/1975 Phal .............................. 198/337

(Continued)

FOREIGN PATENT DOCUMENTS

EP 1840069 A1 10/2007
JP 52105484 9/1977

(Continued)

OTHER PUBLICATIONS

JP 06071780 A Abstract Translation.*

(Continued)

*Primary Examiner* — Atul P. Khare
(74) *Attorney, Agent, or Firm* — Carlson, Gaskey & Olds

(57) ABSTRACT

A method of making a passenger conveyor handrail includes forming a drive member having a plurality of longitudinally spaced drive surfaces. The drive member has a longitudinal stiffness for maintaining a desired spacing between the drive surfaces. The drive member is inserted into a molding device. A gripping surface portion of the handrail is formed using the molding device such that the gripping surface portion and the drive member are secured together. Another method includes forming a belt drive member having a plurality of teeth that establish a plurality of longitudinally spaced drive surfaces. The belt has a longitudinal stiffness for maintaining a desired spacing between the drive surfaces. Each of the teeth extends across an entire width of the belt. The belt is secured to a gripping surface portion of the handrail.

22 Claims, 6 Drawing Sheets

(56) References Cited

U.S. PATENT DOCUMENTS

| | | | | |
|---|---|---|---|---|
| 5,255,772 | A * | 10/1993 | Ball et al. | 198/337 |
| 6,497,318 | B2 | 12/2002 | Schulte et al. | |
| 2005/0173224 | A1 * | 8/2005 | Caunce | 198/337 |

FOREIGN PATENT DOCUMENTS

| | | | | |
|---|---|---|---|---|
| JP | 62066924 | A | | 3/1987 |
| JP | 06071780 | A | * | 3/1994 |
| JP | 2001150566 | A | | 6/2001 |
| WO | 2006110136 | A1 | | 10/2006 |

OTHER PUBLICATIONS

JP 06071780 A Machine Translation.*

International Search Report and Written Opinion of the International Searching Authority for International Application No. PCT/US2007/068516 mailed Jan. 25, 2008.

International Preliminary Report on Patentability for International Application No. PCT/US2007/068516 mailed Aug. 11, 2009.

* cited by examiner

MODULAR HANDRAIL CONSTRUCTION FOR A PASSENGER CONVEYOR HANDRAIL

BACKGROUND

Passenger conveyors are well known. Moving walkways and escalators are used for carrying people between landings at different locations within buildings, for example. Most passenger conveyors include a handrail that moves along with the moving surface that carries the passengers. The handrail provides a gripping surface for passengers to grasp onto while traveling on the conveyor.

Traditionally, handrails have been driven using pinching roller style arrangements. Frictional engagement with forces applied to both sides of the handrail is required for such a drive arrangement to work. These have been recognized as being disadvantageous, at least in part, because the pinching rolls on the exterior surface of the handrail tend to scratch and wear that surface down causing replacement sooner than otherwise desired. It has been proposed to introduce alternative drive arrangements including a positive drive connection between teeth on a handrail and a suitably arranged drive member. Such arrangements are shown, for example, in U.S. Pat. No. 3,633,725 and the Published United States Patent Application US/2005/0173224.

One challenge associated with such a handrail is how to effectively manufacture it to achieve the various features associated with such a handrail. For example, the location of teeth for driving the handrail is where a sliding fabric layer has traditionally been placed. Some modifications to manufacturing techniques are needed.

SUMMARY

An exemplary method of making a passenger conveyor handrail includes providing a drive member having a plurality of longitudinally spaced drive surfaces and a longitudinal stiffness for maintaining a desired spacing between the drive surfaces. The drive member is inserted into a molding device. A gripping surface portion of a handrail is formed using the molding device such that the gripping surface portion and the drive member are secured together.

Another exemplary method of making a passenger conveyor handrail includes providing a belt having a plurality of teeth. Each tooth extends across an entire width of the belt. The belt includes a plurality of tension members that provide sufficient longitudinal stiffness for maintaining a desired longitudinal spacing between the teeth. The belt is secured to a gripping surface portion of the handrail such that the teeth on the belt are arranged for engaging a drive member to drive the handrail.

The various features and advantages of the disclosed examples will become apparent from the detailed description. The drawings that accompany the detailed description can be briefly described as follows.

DETAILED DESCRIPTION

Figure 1:
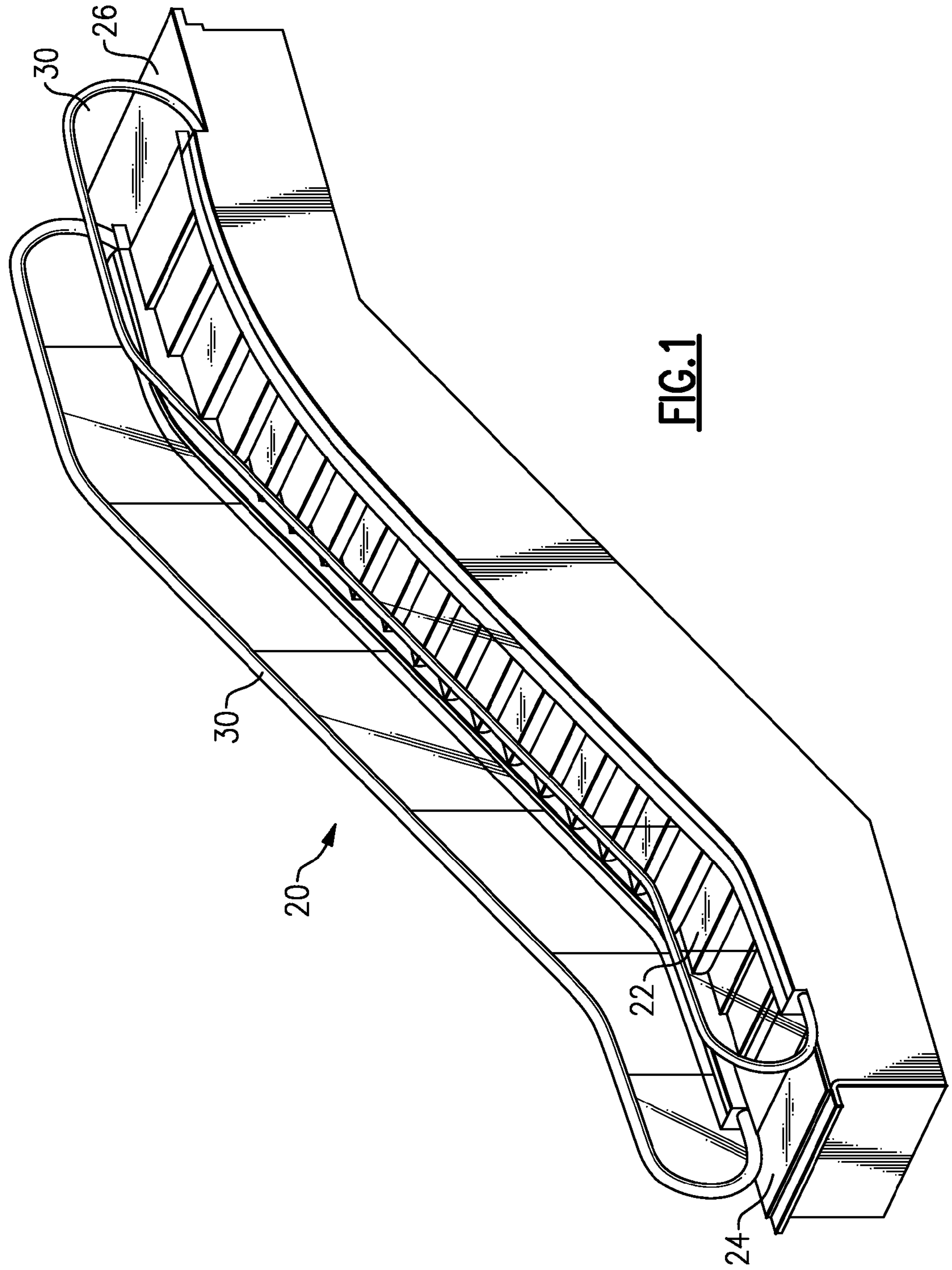
FIG. 1 schematically shows an example passenger conveyor.

FIG. 1 schematically shows a passenger conveyor 20. The illustrated example is an escalator. Another example includes a moving walkway. The example passenger conveyor 20 includes a plurality of steps 22 that move in a desired direction to carry passengers between landings 24 and 26. A handrail 30 provides a gripping surface for a passenger to grasp onto while riding on the conveyor 20.

Figure 2:
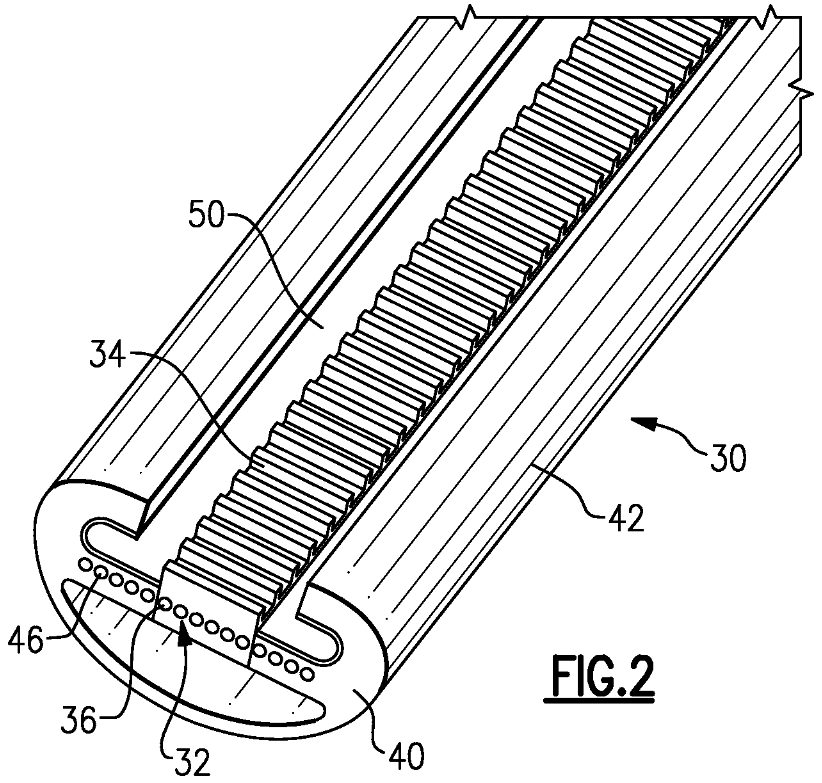
FIG. 2 schematically shows an example passenger conveyor handrail embodiment.

FIG. 2 schematically shows an example handrail 30. This example includes a drive member 32 that has a plurality of longitudinally spaced drive surfaces 34. A plurality of tension members 36 are provided within the drive member 32 to provide longitudinal stiffness that is useful for maintaining a desired spacing between the drive surfaces 34. In the illustrated example, the drive surfaces 34 are provided on teeth that project outwardly along one side of the drive member 32. In this example, the drive member 32 comprises a toothed belt having a body made of a polyurethane material, for example. The tension members 36 comprise polymer or steel cords, for example.

The example handrail 30 includes a gripping surface portion 40 that has an exterior 42 that provides a gripping surface for passengers when the handrail 30 is in use. In this example, a plurality of tension members 46, like the tension members 36 of the drive member 32, are provided in the gripping surface portion 40. The illustrated example also includes a fabric slider layer 50 that facilitates the handrail 30 moving along a guidance (not shown) so that the handrail 30 follows a desired path during passenger conveyor operation.

Figure 3:
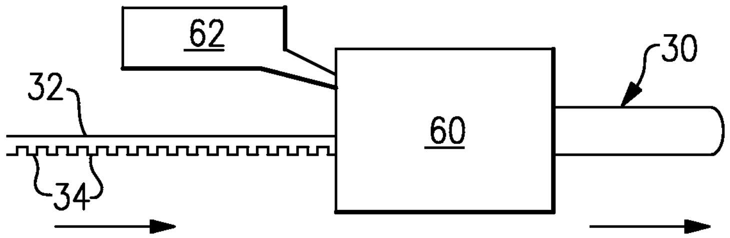
FIG. 3 schematically shows an example manufacturing technique.

FIG. 3 schematically illustrates one example technique for making the handrail 30. This example includes a mold device 60 that receives a supply of material 62 for forming at least the gripping surface portion 40 of the example of FIG. 2. One example includes using a polyurethane material. Another example includes using a rubber material.

As schematically shown in FIG. 3, the drive member 32 is pre-formed and inserted into the molding device 60. The gripping surface portion 40 of the handrail 30 is formed using the molding device 60 and the drive member 32 is secured to the gripping surface portion. In one example, the gripping surface portion is molded onto the drive member 32 within the molding device 60.

One example includes using the drive surfaces 34 on the drive member 32 for propelling the drive member 32 and the handrail 30 through the molding device 60. The same drive surfaces 34 are subsequently useful for driving the handrail 30 during passenger conveyor operation.

Figure 4A:
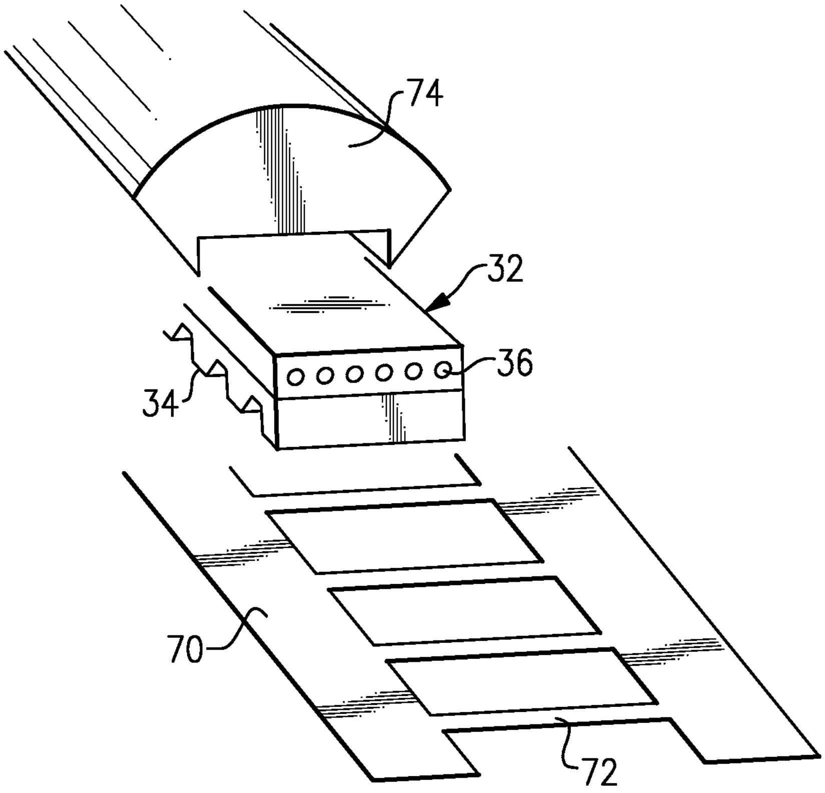
FIGS. 4A and 4B schematically show how to incorporate one example type of drive member into a handrail like the embodiment of FIG. 2.

The drive member 32 may take a variety of forms. One example includes a belt as schematically shown in FIG. 4A. In this example, the belt comprises a polymer material and a plurality of tension members 36. In one example, the tension members 36 comprise steel cords that are arranged lengthwise in the polymer material of the belt. In one example, the polymer comprises a polyurethane. In another example, the polymer comprises rubber. The drive surfaces 34 are established by providing teeth on the belt. FIG. 4A also includes a slider fabric layer 70 having a plurality of transverse portions 72 that are arranged to have a desired alignment with the driving surfaces 34 on the teeth of the belt. In one example, the transverse portions 72 are received within the recesses at the spaces between the teeth. This example also includes a foam insert 74 that has a contour that is useful for establishing the desired contour of the gripping surface 42 of the gripping surface portion 40 of the handrail.

Figure 4B:
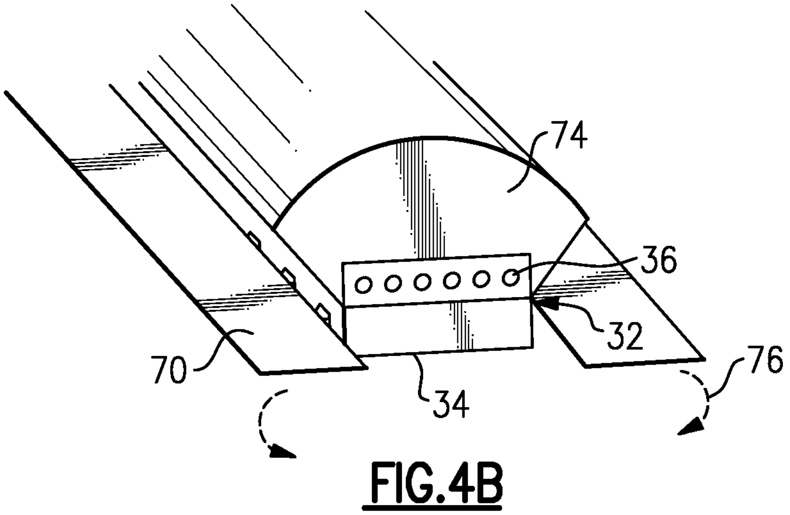

FIG. 4B shows the drive member 32, slider fabric layer 70 and foam insert 74 in a relationship where those pieces are ready to be inserted into a molding device such as the molding device 60 of FIG. 3. As schematically shown at 76, the slider fabric layer 70 can be bent within a corresponding portion of the molding device so that the fabric sliding layer covers a guidance-following portion of the handrail, which is shaped based upon the guidance design. In such an example, the drive surfaces 34 can be used for propelling the components such as the drive member 32, the foam insert 74 and the slider fabric layer 70 through a molding device while a remainder of the handrail is extruded onto these components.

Figure 5:
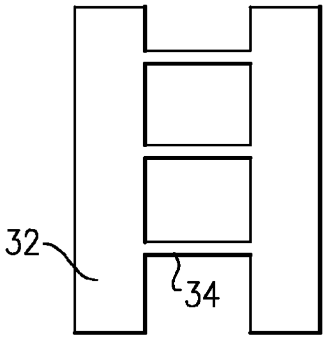
FIG. 5 shows another example drive member.

FIG. 5 schematically shows another example drive member 32. This example comprises a polymer tape with a ladder-like structure. One example comprises a generally planar thin sheet of a selected dimensionally stable polymer material. The material is selected to have sufficient longitudinal stiffness to maintain a desired spacing between the drive surfaces 34 while still allowing the drive member 32 to follow the contour of the path required for the handrail 30 during passenger conveyor operation. The example of FIG. 5 has a ladder-like structure.

Figure 6:
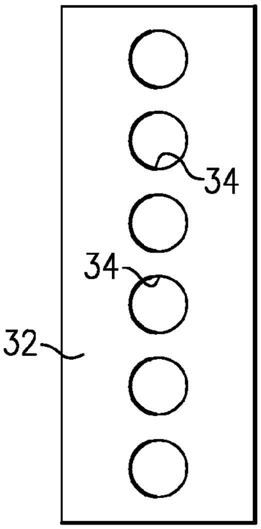
FIG. 6 shows another example drive member.

FIG. 6 schematically shows another example drive member 32. This example comprises a polymer tape having punched openings for establishing the drive surfaces 34. A correspondingly shaped drive belt or wheel will have projections that are received within the openings for engaging the drive surfaces 34 to propel the handrail in a desired manner.

Figure 7:
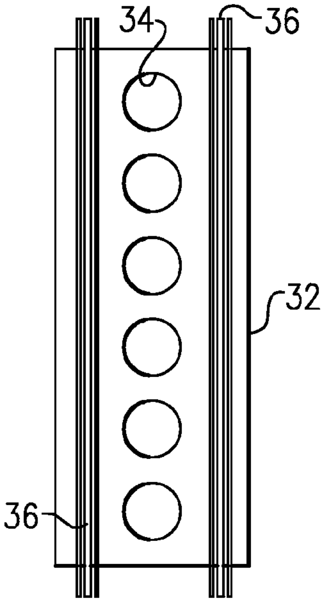
FIG. 7 shows another example drive member.

The example of FIG. 7 is similar to the example of FIG. 6 with the addition of longitudinally extending tension members 36 that are secured to the punched tape drive member 32 using an adhesive or by at least partially melting the material of the tape in the vicinity of the tension members 36 to secure them together, for example. In another example, the tension members 36 are incorporated during a process of making the polymer tape.

Figure 8:
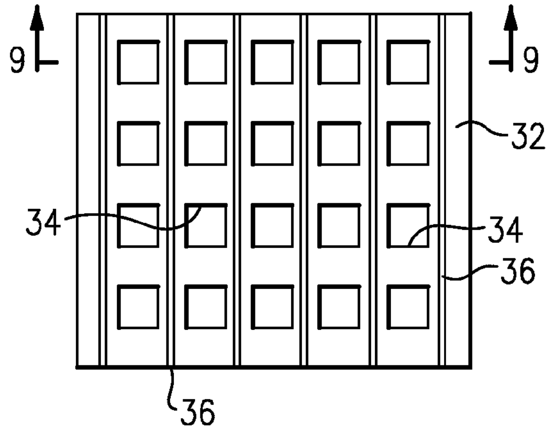
FIG. 8 shows another example drive member.
Figure 9:
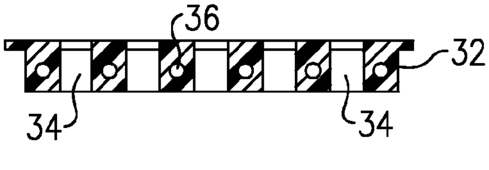
FIG. 9 is a cross-sectional illustration taken along the lines 9-9 in FIG. 8.

FIG. 8 schematically shows another example drive member 32 that comprises a reinforced tape having a plurality of tension members 36. This example includes a plurality of rectangularly shaped removed portions of the tape to establish the drive surfaces 34. In another example, a shape other than rectangular such as round removed portions are included. As can be appreciated from FIG. 9, the removed portions of material of the tape need not extend all the way through the tape. In another example, the recesses are punched holes that extend all the way through the tape. In either case, a correspondingly configured drive member engages the drive surfaces 34 to propel the handrail as desired.

Figure 10:
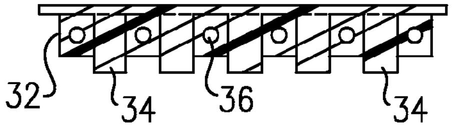
FIG. 10 is a cross-sectional illustration similar to the view of FIG. 9 but of another example drive member.

FIG. 10 schematically shows another example arrangement where the drive surfaces 34 are realized on raised posts that are received within correspondingly shaped recesses on a drive member such as a drive belt or drive wheel for propelling the handrail in a desired manner.

Figure 11:
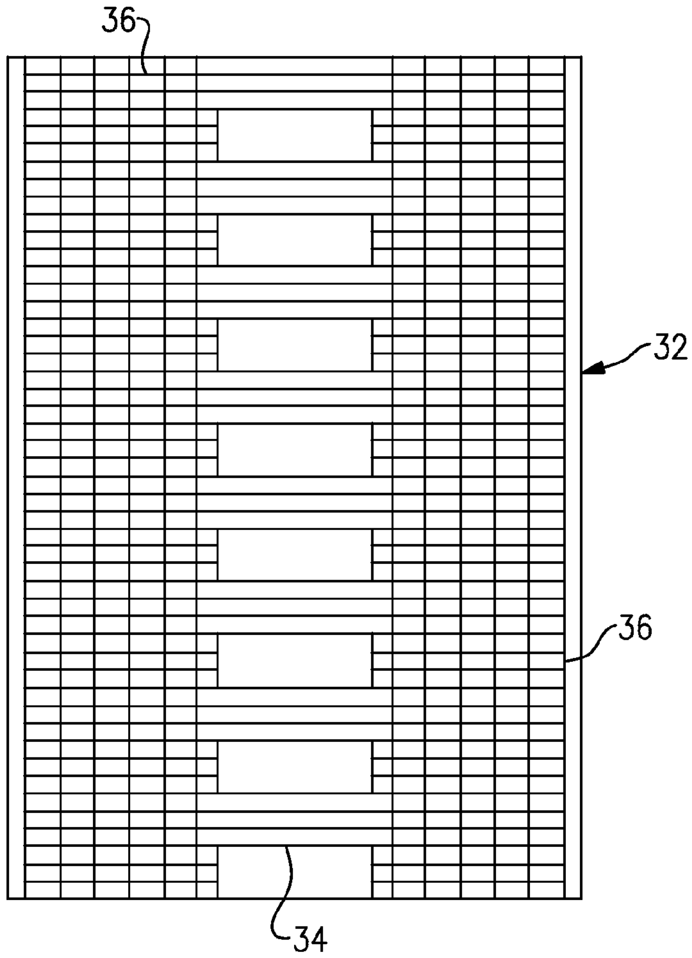
FIG. 11 schematically shows another example drive member.

FIG. 11 shows another example drive member 32. This example comprises a sheet of fabric material such as the type of material used for handrail slider fabrics (e.g., cotton). In this example, a reinforcement is established including tension members 36 arranged in a grid pattern as schematically shown. One example includes impregnating the fabric material with a reinforcing material to establish the tension members 36. Another example includes adhesively securing the tension members 36 to the fabric material.

Figure 12:
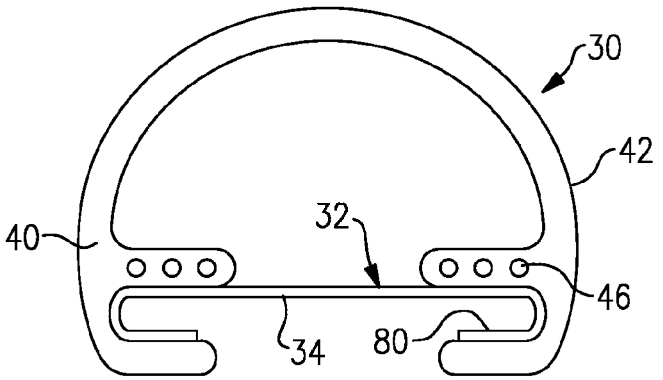
FIG. 12 schematically shows an example drive member like that in FIG. 11 incorporated into an example handrail.

FIG. 12 schematically shows a drive member 32 of the type from any of the examples of FIGS. 5-11 secured to a gripping surface portion 40 of a handrail 30. In this example, the material selected for the drive member has low friction, sliding properties that allows it to be used as a sliding layer for the handrail 30. Accordingly, guidance following portions 80 of the handrail include sliding layers established by appropriately positioning a portion of the drive member 32 within the handrail assembly. In some examples, the material selected for the drive member 32 will not be appropriate for the configuration shown in FIG. 12. In such an example, the driver member 32 may extend only within a single plane as seen in a cross-sectional view like that of FIG. 12 or an additional slider layer may be added.

Figure 13:
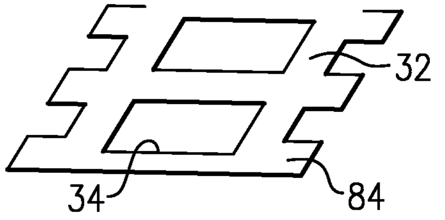
FIG. 13 shows another example drive member.

FIG. 13 schematically shows another example drive member 32. This example comprises a metal band. A plurality of punched out sections establish the drive surfaces 34. This example includes a plurality of tabs 84 that are adapted to be secured within the material of the gripping surface portion 40 of the handrail during a molding process, for example.

Figure 14:
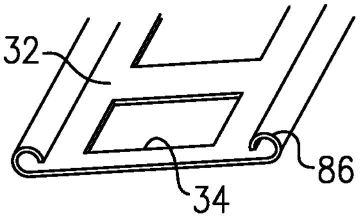
FIG. 14 shows another example drive member.

FIG. 14 shows another example where the drive member 32 comprises a metal band. This example includes contoured edges 86 that are configured to be secured within the material of the core portion 40 of the handrail during a molding process, for example.

Figure 15:
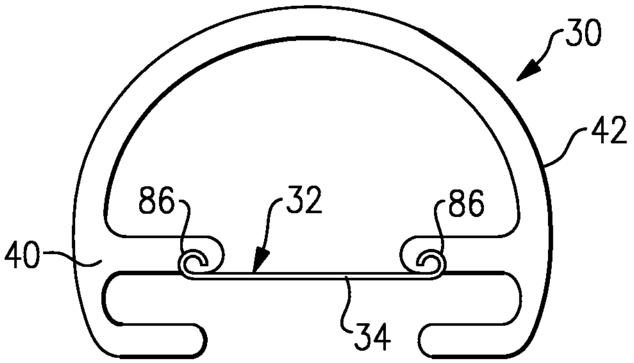
FIG. 15 schematically shows a drive member like the example of FIG. 14 incorporated into an example handrail.

FIG. 15 schematically shows such a drive member 32 within an example handrail configuration. One example advantage of using a metal band as the drive member 32 is that there is no risk of the metal material melting during the extrusion process for establishing the gripping surface portion 40 of the handrail 30.

Figure 16:
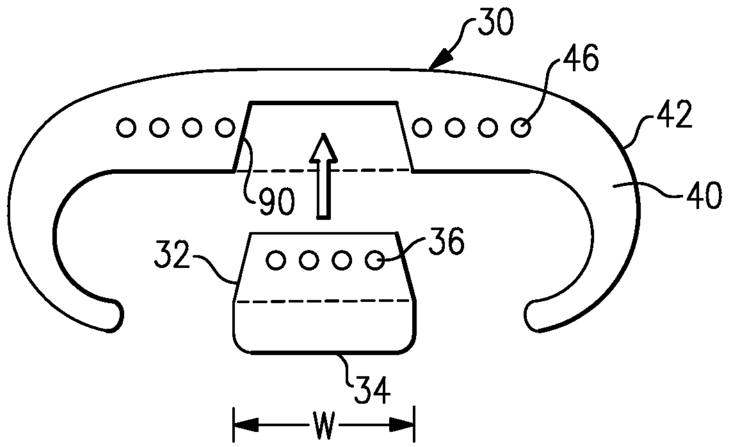
FIG. 16 shows another example manufacturing technique including a drive member comprising a toothed belt.

While it is advantageous in many examples to provide the drive member 32 into a molding device where the core portion of the handrail is formed, the example of FIG. 16 shows an arrangement where the core portion 40 is pre-formed separately from the drive member 32. In this example, the drive member 32 is secured into a longitudinal recess 90, which may be formed during a molding process or may be a section that is removed after the core portion 40 is molded, using an appropriate adhesive or technique for fusing together the materials of the drive member 32 and the gripping surface portion 40.

In this example, the drive member 32 comprises a toothed belt. Each tooth 34 extends across an entire width W of the belt. Tension members 36 are provided in the drive member 32 and tension members 46 are provided in the core portion 40 of the illustrated example. When the drive member 32 is inserted into the recess 90, the tension members 36 and the tension members 46 are aligned in a common plane as closely as possible in one example.

One advantage of the disclosed examples is that they allow for more readily incorporating sliding layers and driving surfaces on a positive drive passenger conveyor handrail. For example, the illustrated drive members allow for incorporating the drive surfaces at the center of an area typically occupied by a slider fabric layer. A drive member can be inserted into a molding or extrusion process that allows for readily securing the drive member to a remainder of the handrail. The example drive members may be used for propelling the handrail during normal passenger conveyor operation and can be used for moving components through a molding device for making the handrail.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of making a passenger conveyor handrail, said method comprising the steps of:

providing a preformed drive member having a plurality of longitudinally spaced drive surfaces for propelling the handrail and having a longitudinal stiffness for maintaining a desired spacing between said drive surfaces, the drive member having the form of a polymer tape or a sheet of fabric material, and the drive member comprising openings extending at least partly therethrough for establishing the drive surfaces;

inserting the drive member into a molding device; and extruding a gripping surface portion of the handrail onto the drive member using the molding device so that the resulting gripping surface portion and the drive member are secured together, the gripping surface portion establishing a shape of the handrail which is distinct from a shape of the drive member.

2. The method of claim 1, wherein the drive member comprises a generally planar, thin sheet of a dimensionally stable material.

3. The method of claim 2, comprising forming the drive member by establishing the plurality of longitudinally spaced drive surfaces on the sheet of material.

4. The method of claim 3, comprising establishing the drive surfaces by removing portions of the material at spaced intervals.

5. The method of claim 3, comprising securing a plurality of longitudinal tension members to the material.

6. The method of claim 2, wherein the sheet of material has a ladder-like structure.

7. The method of claim 1, comprising:

arranging a fabric slider layer having a plurality of cut-out portions adjacent to the drive member so that the cut-out portions and the drive surfaces have a desired longitudinal relationship; and inserting the fabric slider layer with the drive member into the molding device.

8. The method of claim 1, comprising using the spaced drive surfaces for propelling at least the drive member while making the handrail.

9. The method of claim 1, wherein said openings are formed by punching out sections of drive member material.

10. The method of claim 1, comprising inserting a fabric layer with the drive member into the molding device.

11. The method of claim 1, wherein the drive member is a polymer tape, and wherein said openings are formed by punching out sections of the polymer tape.

12. The method of claim 11, wherein the drive member comprises longitudinally extending tension members.

13. The method of claim 1, wherein the drive member is a sheet of slider fabric material comprising a reinforcement.

14. The method of claim 13, comprising impregnating the slider fabric material with a reinforcing material to establish the reinforcement.

15. The method of claim 13, comprising adhesively securing tension members to the slider fabric material to establish the reinforcement.

16. The method of claim 1, comprising securing a plurality of longitudinally extending tension members to the drive member using an adhesive.

17. The method of claim 1, wherein the drive member is a polymer tape, and wherein the method further comprises:

securing a plurality of longitudinally extending tension members to the drive member by at least partially melting material of the tape in the vicinity of the tension members.

18. The method of claim 1, wherein the openings are disposed one after the other longitudinally along the handrail.

19. The method of claim 1, wherein the openings are disposed in a grid-like pattern.

20. The method of claim 1, wherein the openings have a rectangular shape.

21. The method of claim 1, wherein the openings have a round shape.

22. The method of claim 1, wherein the openings extend completely through the drive member.

* * * * *